(12) United States Patent
Smith

(10) Patent No.: US 6,792,448 B1
(45) Date of Patent: Sep. 14, 2004

(54) THREADED TEXT DISCUSSION SYSTEM

(75) Inventor: Marc A. Smith, Redmond, WA (US)

(73) Assignee: Microsoft Corp., Redmond, WA (US)

( * ) Notice: Subject to any disclaimer, the term of this patent is extended or adjusted under 35 U.S.C. 154(b) by 0 days.

(21) Appl. No.: 09/483,707

(22) Filed: Jan. 14, 2000

(51) Int. Cl.$^7$ ............................................. G06F 15/16
(52) U.S. Cl. ..................................... 709/204; 709/205
(58) Field of Search ............................... 709/204, 205, 709/248

(56) References Cited

U.S. PATENT DOCUMENTS

| | | | | |
|---|---|---|---|---|
| 5,434,913 A | * | 7/1995 | Tung et al. .................. | 709/204 |
| 5,757,669 A | * | 5/1998 | Christie et al. ............. | 709/205 |
| 5,819,269 A | * | 10/1998 | Uomini ......................... | 707/7 |
| 5,822,525 A | * | 10/1998 | Tafoya et al. ............... | 709/204 |
| 5,887,143 A | * | 3/1999 | Saito et al. .................. | 709/248 |
| 5,933,599 A | * | 8/1999 | Nolan ......................... | 345/734 |
| 5,956,509 A | * | 9/1999 | Kevner ....................... | 709/330 |
| 6,101,532 A | * | 8/2000 | Horibe et al. ............... | 709/206 |
| 6,105,055 A | * | 8/2000 | Pizano et al. ............... | 709/204 |
| 6,144,991 A | * | 11/2000 | England ..................... | 709/205 |
| 6,195,685 B1 | * | 2/2001 | Mukherjee et al. ......... | 709/205 |
| 6,205,432 B1 | * | 3/2001 | Gabbard et al. ............. | 705/14 |
| 6,433,795 B1 | * | 8/2002 | MacNaughton et al. .... | 345/738 |
| 6,484,196 B1 | * | 11/2002 | Maurille ..................... | 709/206 |
| 2001/0018698 A1 | * | 8/2001 | Uchino et al. .............. | 707/533 |

\* cited by examiner

Primary Examiner—Bunjob Jaroenchonwanit
(74) Attorney, Agent, or Firm—Lyon & Harr, LLP; Katrina A. Lyon

(57) ABSTRACT

A threaded text discussion or chat system includes a client graphical user interface that is rendered on display screens of user computers. In one implementation, the user interface includes a threaded discussion message pane and a social accounting pane that are rendered simultaneously adjacent each other on the display screen. Within the threaded discussion message pane, messages or turns are rendered or listed in a threaded or tree structure. The social accounting pane displays identifying information about each past and current member of a discussion.

21 Claims, 5 Drawing Sheets

THREADED TEXT DISCUSSION SYSTEM

FIELD OF THE INVENTION

The present invention relates to real-time computer discussion or chat systems and, in particular, to such a system that reduces ambiguity in the display of discussion messages.

BACKGROUND AND SUMMARY OF THE INVENTION

Conventional real-time computer discussion or chat systems allow users at multiple separate user computers to communicate with each other substantially simultaneously in real-time. For example, each user is free to enter text messages or "turns" into the discussion system. A central computer system receives the messages or turns and broadcasts them to each of the user computers. The messages or turns are broadcast in the order in which the messages are received at the central computer system (i.e., a first in-first out system). The text messages are displayed on a display screen associated with each user computer as a common sequence and set of messages, thereby allowing all users to communicate with each other simultaneously.

In conventional prior art implementations, the messages or turns are generally non-persistent. Other than a relatively small number of the most recent messages or turns, the older turns in prior art systems scroll from the display and are no longer available to users. Typically, the messages received at a user computer during a first session of a discussion or chat are not again available to that user computer from the discussion system during a subsequent chat. Each user computer typically displays messages or turns that have been transmitted or broadcast only during a session in which the user computer is included in (e.g., logged into) the discussion or room. Messages or turns transmitted in the discussion before a user computer is included are unavailable to that user computer from the discussion system.

The simultaneous communication between multiple users in a conventional discussion system, in combination with the sequential broadcasting of messages, can introduce ambiguities into the communications. The following exemplary message sequence illustrates this communication ambiguity:

User Tom: "Anyone here from LA?"
User Sally: "Anyone here from St. Louis?"
User Jeff: "I am!"

These ambiguities arise because messages can be generated nearly simultaneously by different users, but the discussion system provides no way to specifically associate the responsive message from User Jeff with the correct prior or parent message. (The correctly related messages are sometimes referred to as an adjacency pair.) Moreover, data processing within the computer system that operates the discussion system can introduce delays between the time a user transmits a message and the time the message is broadcast. These delays can further exacerbate the incidence of ambiguities in the discussion system. Studies have shown that significant numbers (e.g., 40 percent) of turns or messages in some discussion systems are repairs for misunderstood or ambiguous prior turns. See, Garcia and Jacobs, Qualitative Sociology, Vol. 21, No. 3, 1998.

Distinct from such real-time computer chat systems are message boards or bulletin boards, such as Usenet newsgroups. Bulletin boards commonly lack the broadcasting of messages that are posted by users. Instead, users access the bulletin board to retrieve information from it. As a result, the communication on bulletin boards is generally passive, as to the bulletin board system, and do not provide generally real-time transmission of messages as in discussion systems. Another distinction between real-time computer discussion systems and bulletin boards is that the latter commonly to maintain a history of posted messages, thereby providing significant persistence. Moreover, some bulletin boards allow users to post messages manually with threaded relationships to prior messages. In particular, users commonly can manually indicate that messages they are posting are to be associated with prior messages as threaded "replies" that are positioned directly under or nested with the prior messages.

The present invention provides a threaded text discussion system and an associated graphical user interface that is rendered on display screens of user (client) computers. In one implementation, the user interface includes a threaded discussion message pane and a social accounting pane that are rendered simultaneously adjacent each other on the display screen. In other implementations, the threaded discussion message pane and the social accounting pane could be arranged differently relative to each other in a simultaneous display or could be displayed or used separately.

Within the threaded discussion message pane, messages or turns are listed in a threaded or tree structure. The messages are threaded in that messages that reference or reply to a prior message are nested or positioned directly under the prior message. The threading of related messages or turns may be performed manually by the user or automatically by the discussion system based upon a messaging heuristic.

The threaded discussion message pane may include a text entry pane within which users enter or type their turns or messages. Threaded messages may be rendered within the threaded discussion message pane with message type indicators that provide a type indication for each message. Exemplary message type indicators include a thread message type indicator which indicates that a message is the start of a new thread, a question message type indicator which indicates that a message is a question, an answer message type indicator which indicates that a message is an answer, and a comment message type indicator which is the default message indication and is non-specific about the message type.

In one implementation, the social accounting pane displays identifying information about each member of a discussion such as, for example, a user name and an email address. Members currently involved in or logged into the discussion are indicated with an attendance field. An entered field and an exit field indicate when each member last entered the discussion and, if not present, when the member last exited the discussion. The social accounting pane may also list a session field indicating the number of sessions or times each member has entered the discussion. Thread, question, answer and comment fields may indicate the numbers of thread, question, answer and comment messages the member has posted.

The threaded discussion message pane and the rendering of messages or turns in a threaded or tree structure eliminate the ambiguity characteristic of conventional real-time computer chat systems. Moreover, rendering messages with message type indicators further provides contextual information by which users can quickly discern the subject matter and their potential interest in the posted messages. In addition, the social accounting pane can give each user contextual information about other users to assist each user in discerning which other users are likely to be contributing desired information to the discussion. These features, alone and together, provide users with quickly discernible contextual information regarding the messages in a discussion system. In contrast, conventional discussion systems confusingly intermix messages and provide virtually no organized contextual information from which users can discern the usefulness of contributions of others to the discussion.

Additional objects and advantages of the present invention will be apparent from the detailed description of the preferred embodiment thereof, which proceeds with reference to the accompanying drawings.

DETAILED DESCRIPTION OF PREFERRED EMBODIMENTS

Figure 1:
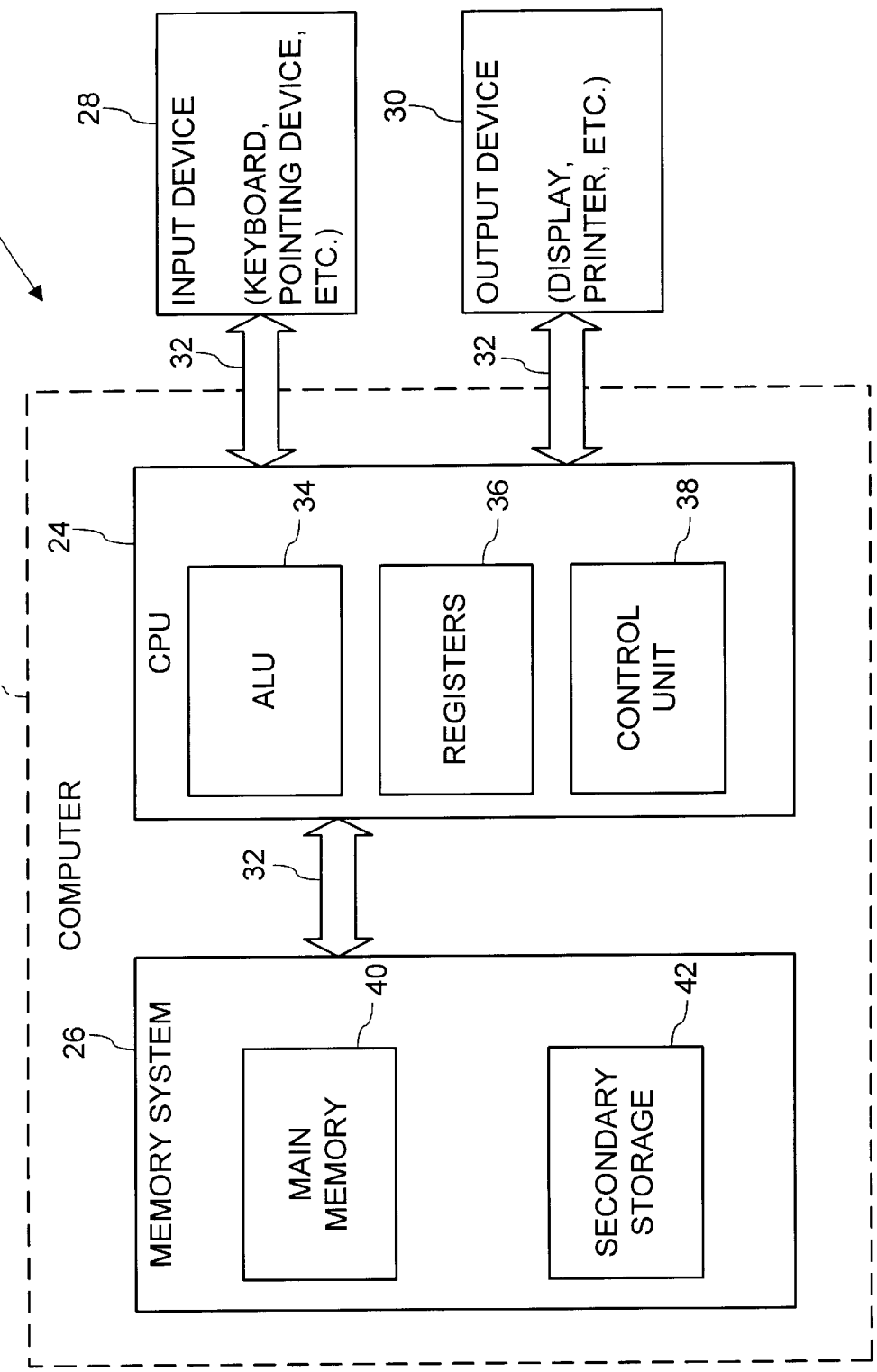
FIG. 1 is a block diagram of a computer system that may be used to implement the present invention.

FIG. 1 illustrates an operating environment for an embodiment of the present invention as a computer system 20 with a computer 22 that comprises at least one high speed processing unit (CPU) 24 in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPC from IBM and Motorola.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28 and 30 also are familiar. The input device 28 can comprise a keyboard, a mouse, a physical transducer (e.g., a microphone), etc. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 26.

In accordance with the practices of persons skilled in the art of computer programming, the present invention is described below with reference to acts and symbolic representations of operations that are performed by computer system 20, unless indicated otherwise. Such acts and operations are sometimes referred to as being computer-executed and may be associated with the operating system or the application program as appropriate. It will be appreciated that the acts and symbolically represented operations include the manipulation by the CPU 24 of electrical signals representing data bits which causes a resulting transformation or reduction of the electrical signal representation, and the maintenance of data bits at memory locations in memory system 26 to thereby reconfigure or otherwise alter the computer system's operation, as well as other processing of signals. The memory locations where data bits are maintained are physical locations that have particular electrical, magnetic, or optical properties corresponding to the data bits.

Figure 2:
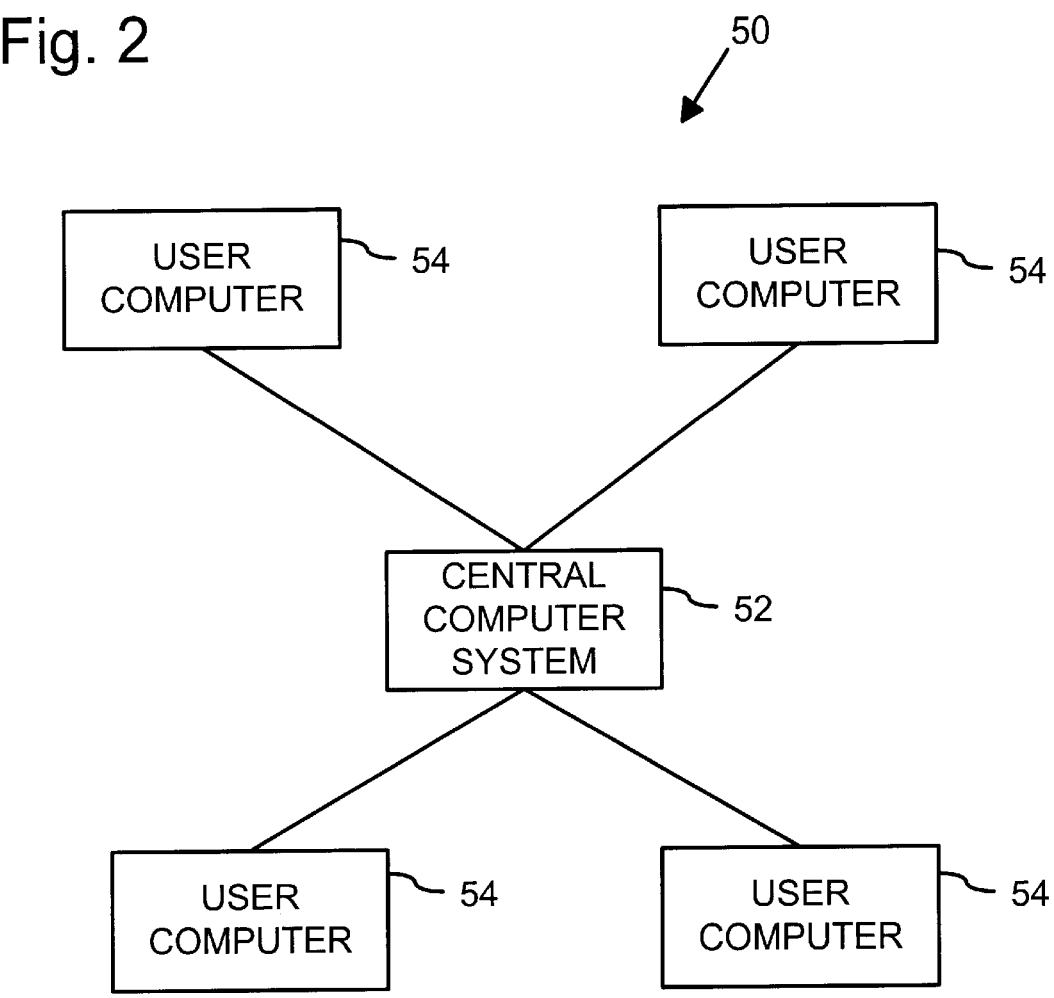
FIG. 2 is a diagram illustrating a real-time computer communication, chat, or discussion system.

FIG. 2 is a diagram illustrating a real-time computer communication, chat, or discussion system 50. Discussion system 50 includes a central computer system 52 in communication with which each of multiple user computers 54 that are each operated by a user. The group of users and user computers 54 that are in communication with each other may be referred to in a variety of ways. A common metaphor is to refer this group as being in a chat room, room, or discussion.

Commonly, central computer system 52 is a distributed system or interconnected central network of computers with which the multiple user computers 54 communicate over a computer network (e.g., the Internet). It will be appreciated, however, that discussion system 50 can be implemented in many different ways such as with central computer system 52 being a single computer, with user computers 54 communicating with central computer system 52 over a local network, etc.

Figure 3:
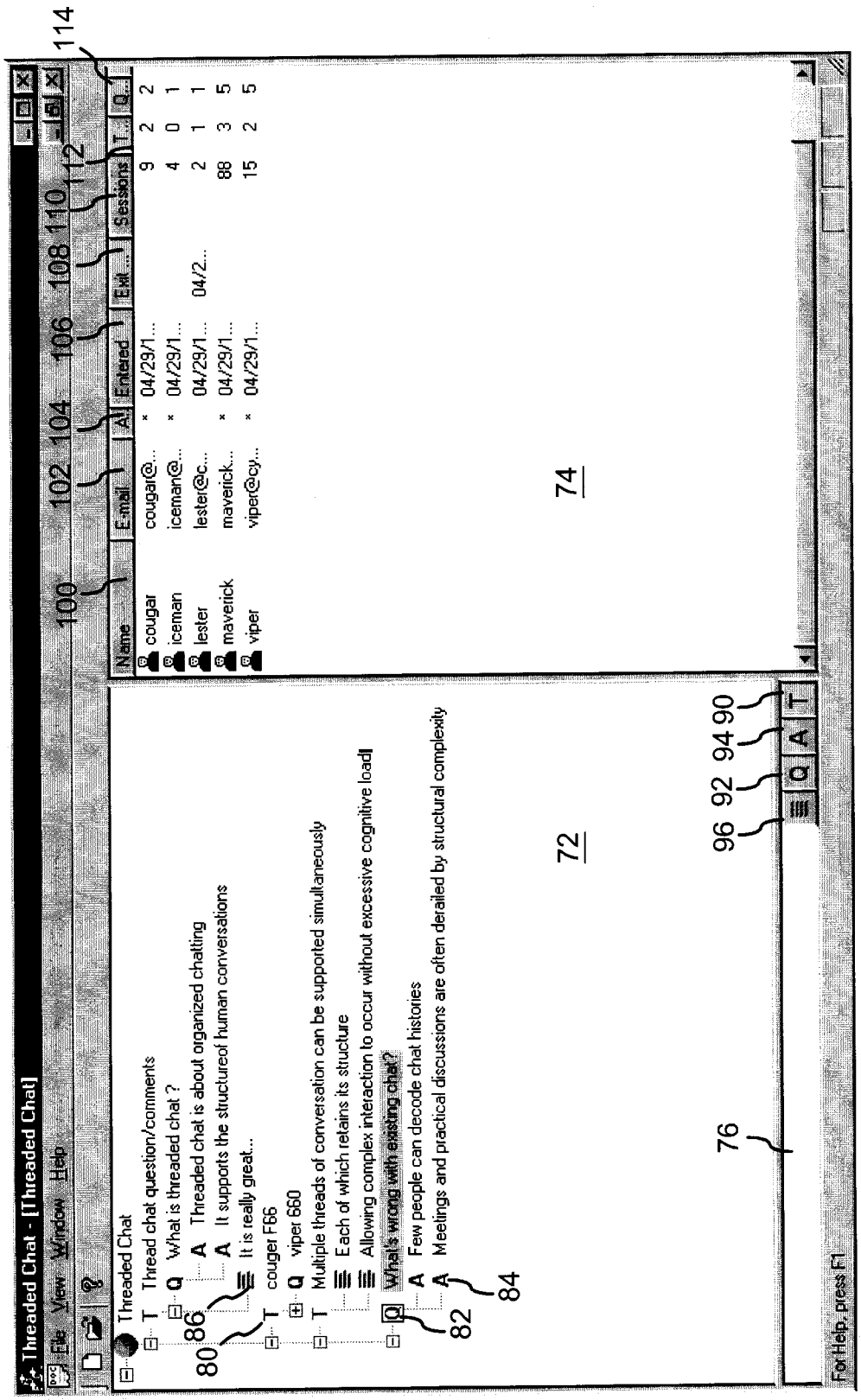
FIG. 3 is an illustration of a graphical user interface for a threaded text discussion system software client.

FIG. 3 is an illustration of a graphical user interface 70 for a threaded text discussion system software client. User interface 70 is rendered on display screens of user or client computers, such as user computers 54. User interface 70 includes a threaded discussion message pane 72 and a social accounting pane 74. In the illustration of FIG. 3, threaded discussion message pane 72 and social accounting pane 74 are rendered simultaneously adjacent each other on the display screen. It will be appreciated, however, that threaded discussion message pane 72 and social accounting pane 74 could be arranged differently relative to each other in a simultaneous display or could be displayed or used separately.

Within threaded discussion message pane 72, messages or turns are rendered or listed in a threaded or tree structure. The threading of related messages or turns may be performed manually by the user or automatically by discussion system 50 based upon a messaging heuristic, as described below in greater detail. Threaded discussion message pane 72 includes a text entry pane 76 within which users enter or type their turns or messages. Threaded messages are rendered within threaded discussion message pane 72 with message type indicators that provide a type indication for each message.

The implementation shown in FIG. 3 illustrates four message types and four corresponding message type indicators: a thread message type indicator 80 which indicates that a message is the start of a new thread, a question message type indicator 82 which indicates that a message is a question, an answer message type indicator 84 which indicates that a message is an answer, and a comment message type indicator 86 which is the default message indication and is non-specific about the message type.

In the illustrated implementation, message type indicators 80–86 are rendered according to which of respective graphical text input controls 90–96 are selected by the user to transmit to discussion system 50 text that is typed or otherwise entered into text entry pane 76. It will be appreciated, however, that message transmission and simultaneous message type indications could alternatively be made by a user with predefined keystrokes. For example, the keystrokes CTRL-T, CTRL-Q, CTRL-A and ENTER, or any other keystrokes, could simultaneously transmit a message to the discussion system and provide respective message type indicators 80–86.

Conventional prior art chat systems are directed to generally recreational uses. Commonly, users enter the chat room and from that time are provided a list of users in the room and the chat messages that are broadcast to the room. While such chat rooms are capable of supporting simultaneous recreational communication, they are poorly suited to collaborative discussions directed to a joint goal or task such as in a business or professional context. Threaded discussion message pane 72 resolves the dissociations and ambiguities between messages characteristic of conventional chat systems.

Moreover, social accounting pane 74 further supports collaborative discussions directed to a joint goal or task by displaying persistent information about past and current members of a discussion. For example, social accounting pane 74 displays identifying information about each member such as, for example, a user name 100 and an email address 102. Members currently involved in or logged into the discussion are indicated with an attendance field 104 (e.g., shown as asterisks in the illustrated implementation). An entered field 106 and an exit field 108 indicate when each member last entered the discussion and, if not present, when the member last exited the discussion. In the illustrated example, all listed users other than user "lester" are present in the discussion.

Social accounting pane 74 also lists a session field 110 indicating the number of sessions or times each member has entered the discussion and thread, question, answer and comment fields (only thread field 112 and question field 114 are shown) indicating the numbers of thread, question, answer and comment messages the member has posted.

In one implementation, discussion system 50 stores the messages or turns so that they are generally persistent. All turns from all sessions of a discussion are available to each user during each session, even messages that are originally transmitted in the discussion when a user computer 54 is not included in the discussion. Such persistence for messages allows discussion system 50 to provide communication for collaborative work and to maintain a useful record of such communication.

In one implementation, messages in discussion system 50 include data that are structured with the following turn-structured quasi-synchronous discussion header data format:

---

Thread-Owner: UserID (Email/url)
Thread Permissions: <READ: {World, Group, Me}>,
<WRITE: {World, Group, Me}>,
<EXECUTE: {World, Group, Me}>
Thread-Type: <Ballot>, <Binary>, <Rating>
Turn Owner-(author): UserID (Email/url)
Turn-ID: <UserID (Email/url), Date, Time, Host>
Turn-Target: <ThreadBuffer>, <WhiteBoard>, <Application>
Turn-Type: <Thread>, <Question>, <Answer>, <Comment>, <Vote>, <Binary>, <Rating>
Turn-URL: URL
Turn-Parents: <UserID (Email/url), Date, Time, Host>, <UserID (Email/url)Date, Time, Host>, etc.
Date and Time Initiated:
Date and Time Received:
Turn Keywords: Machine selected
Content: HTML

---

These data fields are described as follows.

Thread-Owner: UserID (Email/url)—Threads are by default publicly writeable, but are owned by the initiator of the thread. By default, users own threads that are stored on their own web servers. Thread rights can be changed by the owner and delegated or even permanently transferred to other users or groups by use of Thread Permissions. Thread rights govern rights of access, addition, modification, and deletion to a thread and can be differentially granted to individuals, groups, or made public.

Thread-Permissions: <READ: {World, Group, Me}>, <WRITE: {World, Group, Me}>, <EXECUTE: {World, Group, Me}>—The Thread-Owner may separately assign different groups or individuals the rights to Write to a thread, read a thread or execute. As one example, some threads may be writable only by their authors. Once the author completes and enters the last message in the thread, the permissions may be opened to a group or the world.

Thread-Type: <Ballot>, <Binary>, <Rating>, <Invitation>—Threads of a default unspecified type can have any replies, as illustrated above in FIG. 3. Threads can alternatively have specialized forms that constrain replies. Some threads can restrict and preformat replies of other users. For example, "invitations" produce a set of user names linked to blank text fields, only the named users can reply in those locations (although an "other" field might be present as well). Specific individuals are thus explicitly identified as requested respondents. Ballot threads generate multiple choice objects that allow specified groups of users (or all) to contribute to a response. With Thread-Permissions and Thread-Types used together, both the respondents and the formats of their responses can be specified.

Turn-Owner-(author): UserID (Email/url)—Provides unique identification of each discussion system user according to a combination of email address and url/server address.

Turn-ID: <UserID (Email/url), Date, Time, Host>—Provides unique identification of each message according to a combination of email address and url/server address of the posting user, the date and time of the post, and an identification of the discussion system host.

Turn-Target: <ThreadBuffer>, <WhiteBoard>, <Application>—Each turn is addressed to a particular discussion device or helper application like a whiteboard. The default output target is the message threader that displays collapsible trees. The client communicates with any application or scripting language—exchanging messages between the discussion interface and independent applications which could also be network interaction media. A single user event might trigger an array of messages to different target applications. For example, updating the text buffer, opening a whiteboard, and instructing a keyword filter to add new terms and scan a new group of threads.

Turn-Type: <Thread>, <Question>, <Answer>, <Comment>, <Vote>, <Binary>, <Rating>

Turn-URL: This field provides a network address (e.g., URL) that is included in or referenced by a turn.

Turn-Parent: <UserID (Email/url), Date, Time, Host>, <UserID (Email/url)Date, Time, Host>, etc.—Provides unique identification of the parent(s) of each message according to a combination of email address and url/server address of the posting user, the date and time of the parent post or posts. Parent posts are messages that a selected message is responding to or threaded from. A responsive message mey be considered a direct reply to an immediate parent or an indirect reply to any higher-level parents.

Date and Time Initiated: Indicates the date and time at which a user begins entering a turn into, for example, text entry pane 76.

Date and Time Received: Indicates the date and time at which a Turn is received by the system host (e.g., central computer system 52).

Turn-Keywords: Machine selected

Content: HTML

Each message or turn may be addressed by a data structure in the following format:

/server/channel/thread group/thread/user/application/data

The server tag identifies the particular central computer system 52 that supports the chat or discussion. The channel tag identifies a particular group of chats or discussions on the central computer 52 with which the discussion is associated. The thread group tag identifies the particular discussion or chat. The thread tag identifies the particular thread to which the message or turn is posted. The user identifies the person who posts the message or turn. The application identifies the application, and the data tag includes the message to be posted.

Figure 4:
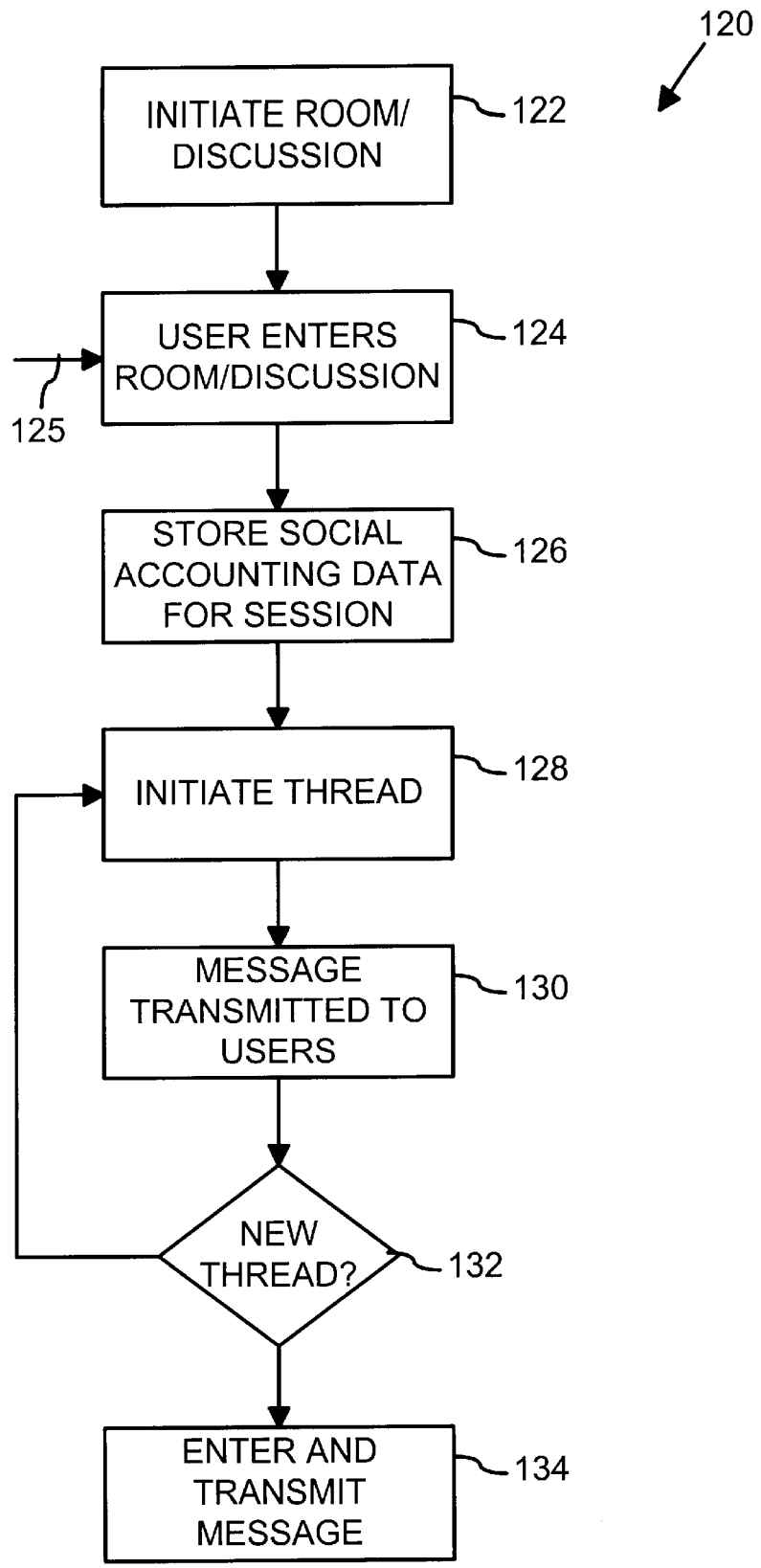
FIG. 4 is a flow diagram illustrating operation of a threaded discussion software process that in one implementation operates with the graphical user interface of FIG. 3.

FIG. 4 is a flow diagram illustrating operation of a threaded discussion software process 120 that in one implementation operates with graphical user interface 70. Threaded discussion software process 120 is performed by central computer system 52 and user computers 54 and is described with reference to a persistent "room" or discussion operating on chat or discussion system 50 and accessible to multiple users operating multiple user computers 54. In such an implementation, process 120 would be suitable for use in a collaborative work with a relatively limited number of users. It will be appreciated that process 120 could alternatively be applied to a discussion system without persistence of messages.

Process block 122 indicates that a room or discussion is initiated. In one implementation, the room or discussion is initiated by a Room-Owner who has a UserID (Email/url). Rooms are by default publicly writeable and readable. Room rights can be changed by the owner and delegated or even permanently transferred to other users or groups by use of Room Permissions analogous to the Thread Permissions described above. Room rights govern rights of access and addition of messages to the room and can be differentially granted to individuals, groups, or made public.

Process block 124 indicates that a user logs into or enters the room or discussion. Entry into and participation in the room or discussion is subject to the user satisfying the Room Permissions. The time during which a user is in the room or discussion is referred to as a session. User interface 70, with threaded discussion message pane 72 and social accounting pane 74, is rendered on a display screen associated with the user's computer 54. As indicated by function flow arrow 125, users with suitable Room Permissions may directly access an existing room.

Process block 126 indicates that each session has associated with it one or more social accounting data fields that are persistently stored within system 50. The social accounting data fields may include one or more fields indicating for that user a Session Initiation Date and Time, a Session Termination Date and Time, a Session Count, and Message Type Counts for selected message types (e.g., threads, questions, answers, comments) that are updated during a session. These social accounting fields provide the data displayed to all users within social accounting pane 74 (FIG. 3).

Process block 128 indicates that a user initiates a thread by, for example, entering text into text entry pane 76 and transmitting the message to discussion system 50 by selecting text input control 90. In one implementation, threaded discussion software process 120 includes automatic context-based message threading and type indication. In this implementation, process 120 could automatically provide a thread identifier to a first thread in the discussion with the user selecting a generic input control (e.g., a RETURN or ENTER key) based upon the absence of any other turns or messages in the discussion. This automatic context-based message threading and type indication may also be applied in other contexts, as described below in greater detail.

The message or turn initiating the thread has associated with it one or more thread-related fields and one or more message- or turn-related fields that are persistently stored within system 50. The thread-related fields may indicate Thread-Owner, Thread-Permissions, and Thread-Type. The message- or turn-related fields may indicate Turn-Owner, Turn-ID, Turn-Target, Turn-Type, Date and Time Initiated, Date and Time Received, and Content, and optionally Turn-URL and Turn-Keywords. The Thread-Owner and Turn-Owner fields are established automatically by process 120 based upon the identity of the user whose message or turn initiates the thread.

The fields Turn-ID, Turn-Target, Date and Time Initiated, and Date and Time Received are established automatically by process 120 based upon the chat or discussion to which the turn is directed by the user and when the chat or discussion is initiated and received by the chat system. The field Content and optionally Turn-URL and Turn-Keywords are entered or indicated by the user. In another implementation, discussion system 50 can automatically identify predetermined terms in the Turn-Keywords field. With respect to process block 128, the fields Turn-Type and Turn-Parents are set according to the message or turn representing the start of a thread.

Thread-Permissions and Thread-Type may remain default values or may be selected by the user initiating the thread. In one implementation, selection of text input control 90 to transmit a thread initiating message causes a window or menu to be displayed listing user-selectable options for non-default values of Thread-Permissions and Thread-Type, or other user-selectable fields. The user initiating the thread selects any desired non-default values and accepts them, which results in the message being transmitted to discussion system 50.

For example, the user initiating the thread could select Thread-Permissions <READ: {Group}>, <WRITE: {Group}>, <EXECUTE: {Me}>and a Thread-Type of <Ballot> with several message choices specified. Such selections would allow a specified group to read the thread and write replies, but the replies could be only of the specified message choices.

Process block 130 indicates that the message or turn for the initiated thread is transmitted to and displayed at user computers 54 that are logged into the room or discussion.

Inquiry block 132 represents an inquiry as to whether the next message or turn received by discussion system 50 represents a new thread. Whenever the next message or turn received by discussion system 50 represents a new thread, inquiry block 130 returns to process block 128. Whenever the next message or turn received by discussion system 50 does not represent a new thread, inquiry block 132 proceeds to process block 134.

Process block 134 indicates that a user enters a message or turn that is included in an existing thread by, for example, entering text into text entry pane 76 and transmitting the message to the discussion system by selecting one of text input control 92–96. The user may manually indicate a previous turn from which the new turn is to be threaded by graphically selecting or indicating the previous turn in message pane 72, such as with a graphical input device like a mouse.

The new message or turn to be included in an existing thread has associated with it one or more thread-related fields and one or more message- or turn-related fields that are persistently stored within system 50. The thread-related fields may indicate Thread-Owner, Thread-Permissions, and Thread-Type. The message- or turn-related fields may indicate Turn-Owner, Turn-ID, Turn-Target, Turn-Type, Date and Time Initiated, Date and Time Received, and Content, and optionally Turn-URL and Turn-Keywords.

The Thread-Owner and Turn-Owner fields are established automatically by process 120 based upon the identity of the user whose message or turn initiates the thread, which may be obtained from the previous turn from which the new turn is to be threaded. The fields Turn-ID, Turn-Target, Date and Time Initiated, and Date and Time Received are established automatically by process 120 based upon the chat or discussion to which the turn is directed by the user and when the turn or message is initiated and received by the chat system. The field Content and optionally Turn-URL and Turn-Keywords are entered or indicated by the user in another implementation, discussion system 50 can automatically identify predetermined terms in the Turn-Keywords field. The field Turn-Type is set according to the message or turn representing the start of a thread, and the field Turn-Parents is set according to which of the messages in the thread are parents to other messages.

Figure 5:
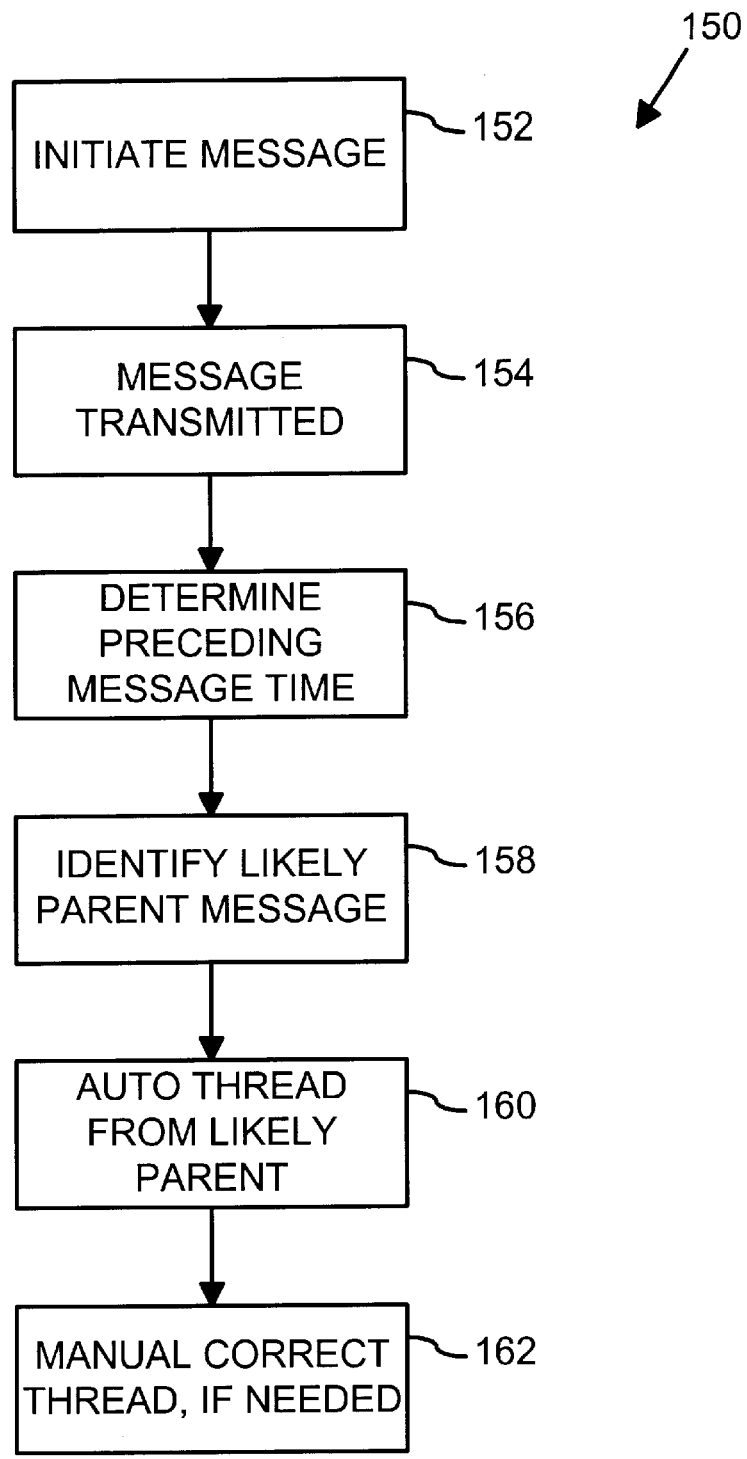
FIG. 5 is a flow diagram of an automatic context-based message threading process.

FIG. 5 is a flow diagram of an automatic context-based message threading process 150. Process 150 automatically associates a responsive new message or turn with an existing turn and its thread in contrast to an association that is indicated manually by a user as described with reference to FIG. 4.

Process block 152 indicates that a new message is initiated by, for example, being entered into text entry pane 76. As described above, the initiation is indicated by a Date and Time Initiated field.

Process block 154 indicates that the message is transmitted to discussion system 50.

Process block 156 indicates that a preceding message transmission threshold time is determined from the Date and Time Initiated field for the new message. For example, the preceding message transmission threshold time could be determined as a predefined amount of time before the Date and Time Initiated field for the new message.

Process block 158 indicates that a likely parent message is identified as the message that is transmitted by discussion system 50 most recently before the preceding message transmission threshold time.

Process block 160 indicates that the new message is automatically threaded from the likely parent message and transmitted as such by discussion system 50.

Process block 162 indicates that the user who created the new message may manually specify its threading if the automatic threading is incorrect. In one implementation, the user could use a graphical user input device like a mouse to "click and drag" the new message as rendered in message pane 72 to a correct thread location. This correction capability could be available for only a predetermined time after the message is transmitted and would be available only to the transmitting user.

Automatic context-based message threading process 150 operates on an understanding that in a discussion or chat context many messages or turns that are not initiating threads are made as timely responses to immediately preceding messages. The preceding message transmission threshold time is selected to accommodate the typical time for an immediately preceding message to be transmitted and read by users, and for them to initiate a response, thereby to improve the accuracy of the automatic message threading.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope, of our invention. Rather, we claim as our invention all such embodiments as may come within the scope and spirit of the following claims and equivalents thereto.

What is claimed is:

1. In a real-time computer chat system having a central computer system with which each of multiple user computers is in communication such that a common sequence and set of messages are transmitted among the user computers as real-time messages of a real-time discussion between users of the user computers, the real-time messages being entered at the user computers into text entry panes that are rendered together with the real-time discussion, ones of the real-time messages being real-time responsive messages that are responsive to prior ones of the real-time messages, the system including a computer-readable medium that stores computer software instructions for operating the system, the improvement comprising:

computer software instructions stored on the computer-readable medium for associating in real-time each of the real-time responsive messages with the respective prior real-time message to which each of the real-time responsive messages is a reply; and computer software instructions stored on the computer-readable medium for rendering on the user computers in real-time an indication of an association between each of the real-time responsive messages and the prior real-time message to which each of the real-time responsive messages is a reply, the indication of an association including rendering in real-time each of the real-time responsive messages in a tree arrangement with the prior real-time message to which each of the real-time responsive messages is a reply.

2. The system of claim 1 further comprising:

computer software instructions stored on the computer-readable medium for providing plural sessions of communication between any of the user computers and the central computer system, one or more of the user computers not being in communication with the central computer system during a first session when at least one real-time message is originally transmitted among the user computers; and computer software instructions stored on the computer-readable medium for persistently maintaining and providing to the user computers the messages of the discussion, including providing the at least one real-time message to the one or more of the user computers during one or more second sessions after the first session.

3. The system of claim 2 which the computer software instructions for persistently maintaining and providing to the user computers the messages of the discussion further provides the at least one real-time message to each of the user computers during each session after the first session.

4. The system of claim 1 further comprising:

software instructions stored on the computer-readable medium for allowing users of the user computers to designate messages they transmit as being of at least first and second selected message types; and software instructions stored on the computer-readable medium for rendering on the user computers each message type indication adjacent to the message.

5. The system of claim 4 in which the at least first and second selected message types include at least two of a thread message type, a question message type, an answer message type, and a comment message type.

6. The system of claim 1 in which ones of the messages are designated as being of at least first and second selected message types, the system further comprising software instructions stored on the computer-readable medium for rendering on the user computers message type indications adjacent to the message to designate the messages that are of the at least first and second selected message types.

7. The system of claim 1 in which each real-time responsive message has associated with it an initiation time at which the message was initiated, the system further comprising computer software instructions stored on the computer-readable medium for automatically designating real-time responsive messages as replies to specific prior real-time messages based upon the initiation time of the real-time responsive message.

8. The system of claim 7 further comprising computer software instructions stored on the computer-readable medium for allowing a user to manually correct any erroneous automatic association between a responsive message and a prior message.

9. The system of claim 1 further comprising:

computer software instructions stored on the computer-readable medium for providing plural sessions of communication between any of the user computers and the central computer system, users of the user computers participating in the discussion during the sessions; and computer software instructions stored on the computer-readable medium for rendering on the user computers a summary of participation in the discussion by the users during the plural sessions.

10. In a real-time computer chat system having a central computer system with which each of multiple user computers is in communication such that a common sequence and set of messages are transmitted among the user computers as real-time messages of a real-time discussion between users of the user computers, the user computers including display screens and the real-time messages being rendered on the display screens, the real-time messages being entered at the user computers into text entry panes that are rendered together with the real-time messages, ones of the real-time messages being real-time responsive messages that are responsive to prior ones of the real-time messages, a graphical user interface rendered on displays screens, comprising:

a message association indication rendered on the display screen in real-time and indicating a threaded association between each of the real-time responsive messages and the prior real-time message to which each of the real-time responsive messages is a reply, the message association indication including each real-time responsive message being rendered in real-time in a tree arrangement with the prior real-time message to which each of the real-time responsive messages is a reply.

11. The system of claim 10 further comprising a message type indication rendered on the display screen adjacent each message and indicating for each message that it is of at least first and second selected message types.

12. The system of claim 11 in which the at least first and second selected message types include at least two of a thread message type, a question message type, an answer message type, and a comment message type.

13. The system of claim 10 in which users of the user computers participate in the discussion during plural sessions, the system further comprising user participation indication rendered on the display screen and indicating participation in the discussion by the users during the plural sessions.

14. In a real-time computer chat system having a central computer system with which each of multiple user computers are in communication such that a common sequence and set of messages are transmitted among the user computers as real-time messages of a real-time discussion between users of the user computers, the real-time messages being entered at the user computers into text entry panes that are rendered together with the real-time discussion, ones of the real-time messages being real-time responsive messages that are responsive to prior ones of the real-time messages, a method comprising:

associating in real-time each of the real-time responsive messages with the respective prior real-time message to which each of the real-time responsive messages is a reply; and rendering on the user computers in real-time an indication of an association between each of the real-time responsive messages and the prior real-time message to which each of the real-time responsive messages is a reply, the indication of an association including rendering in real-time each of the real-time responsive messages in a tree arrangement with the prior real-time message to which each of the real-time responsive messages is a reply.

15. The method of claim 14 further comprising:

providing plural sessions of communication between any of the user computers and the central computer system, one or more of the user computers not being in communication with the central computer system during a first session when at least one real-time message is originally transmitted among the user computers; and persistently maintaining and providing to the user computers the messages of the discussion, including providing the at least one real-time message to the one or more of the user computers during one or more second sessions after the first session.

16. The method of claim 14 further comprising allowing users of the user computers to designate messages they transmit as being of at least first and second selected message types and rendering on the user computers each message type indication adjacent to the message according to the designations.

17. The method of claim 16 in which the at least first and second selected message types include at least two of a thread message type, a question message type, an answer message type, and a comment message type.

18. The method of claim 16 further comprising rendering on the user computers message type indications according to designations made by users who transmit messages as being of the at least first and second selected message types.

19. The method of claim 14 in which each real-time responsive message has associated with it an initiation time at which the message was initiated, the method further comprising automatically designating responsive real-time messages as replies to specific prior real-time messages based upon the initiation time of the real-time responsive message.

20. The method of claim 19 further comprising allowing a user to manually correct any erroneous automatic association between a responsive message and a prior message.

21. The method of claim 14 further comprising:

providing plural sessions of communication between any of the user computers and the central computer system, users of the user computers participating in the discussion during the sessions; and rendering on the user computers a summary of participation in the discussion by the users during the plural sessions.

* * * * *